(12) United States Patent
Carlson et al.

(10) Patent No.: US 7,061,992 B2
(45) Date of Patent: Jun. 13, 2006

(54) PARALLEL CORRELATOR ARCHITECTURE

(75) Inventors: Brent R. Carlson, Oliver (CA); Peter E. Dewdney, Penticton (CA)

(73) Assignee: National Researc Council of Canada, Ottawa (CA)

( * ) Notice: Subject to any disclaimer, the term of this patent is extended or adjusted under 35 U.S.C. 154(b) by 849 days.

(21) Appl. No.: 09/936,819

(22) PCT Filed: Jan. 17, 2001

(86) PCT No.: PCT/CA01/00038

§ 371 (c)(1),
(2), (4) Date: Nov. 21, 2001

(87) PCT Pub. No.: WO01/53982

PCT Pub. Date: Jul. 26, 2001

(65) Prior Publication Data

US 2002/0168035 A1  Nov. 14, 2002

Related U.S. Application Data

(60) Provisional application No. 60/176,298, filed on Jan. 18, 2000.

(51) Int. Cl.
  *A03K 9/00* (2006.01)
(52) U.S. Cl. .................................................. 375/316
(58) Field of Classification Search ................ 375/347, 375/350, 316, 329, 334, 337, 339; 370/210, 370/208, 281, 302, 206, 204; 455/150.1, 455/339, 427
See application file for complete search history.

(56) References Cited

U.S. PATENT DOCUMENTS

| | | | | |
|---|---|---|---|---|
| 4,066,842 A | * | 1/1978 | Allen ........................... 381/66 |
| 5,184,134 A | * | 2/1993 | Niho et al. .................. 342/25 R |
| 5,812,523 A | * | 9/1998 | Isaksson et al. ............. 370/208 |
| 5,848,097 A | * | 12/1998 | Carney et al. ............... 375/219 |
| 5,999,573 A | * | 12/1999 | Zangi ........................... 375/316 |
| 6,226,336 B1 | * | 5/2001 | Atarius et al. ............... 375/364 |
| 6,229,988 B1 | * | 5/2001 | Stapefeld et al. .......... 340/7.35 |
| 6,263,195 B1 | * | 7/2001 | Niu et al. ................... 455/150.1 |
| 6,271,787 B1 | * | 8/2001 | Springer et al. ............. 342/195 |
| 6,449,244 B1 | * | 9/2002 | Loseke ........................ 370/208 |
| 6,836,660 B1 | * | 12/2004 | Wala ........................... 455/434 |
| 2004/0078205 A1 | * | 4/2004 | Liljeryd et al. .............. 704/503 |

* cited by examiner

*Primary Examiner*—Emmanuel Bayard
(74) *Attorney, Agent, or Firm*—Freedman & Associates

(57) ABSTRACT

The present invention relates to real time spectral analysis of wide-band sampled signals, in particular to a method and system for real time digital spectral analysis of wide-band sampled signals using parallel processing techniques. The center frequency of each received wide-band signal is shifted by a small fraction $\epsilon$ of its bandwidth. After sampling and digitizing, the wide-band signals are de-multiplexed into N parallel sample streams for parallel processing. The sample streams are digitally FIR filtered and sub-band signals are determined by decimating the sample streams by a factor of $2^k \cdot N; k=0,1,\ldots$, wherein only every $2^k \cdot N^{th}; k=0,1,\ldots$ sample is retained and the others are discarded. These sub-band signals may then be processed using various methods of spectral analysis such as cross-correlation, auto-correlation or phased array applications. Any finite-length FIR filter has a finite transition band. After decimation, the transition band outside sub-band boundaries will suffer aliasing, which causes signals to falsely appear as aliased signals within the sub-band. Shifting all spectral features in the wide-band spectrum with a frequency shift $\epsilon$ prevents false correlation of the aliased signals.

28 Claims, 11 Drawing Sheets

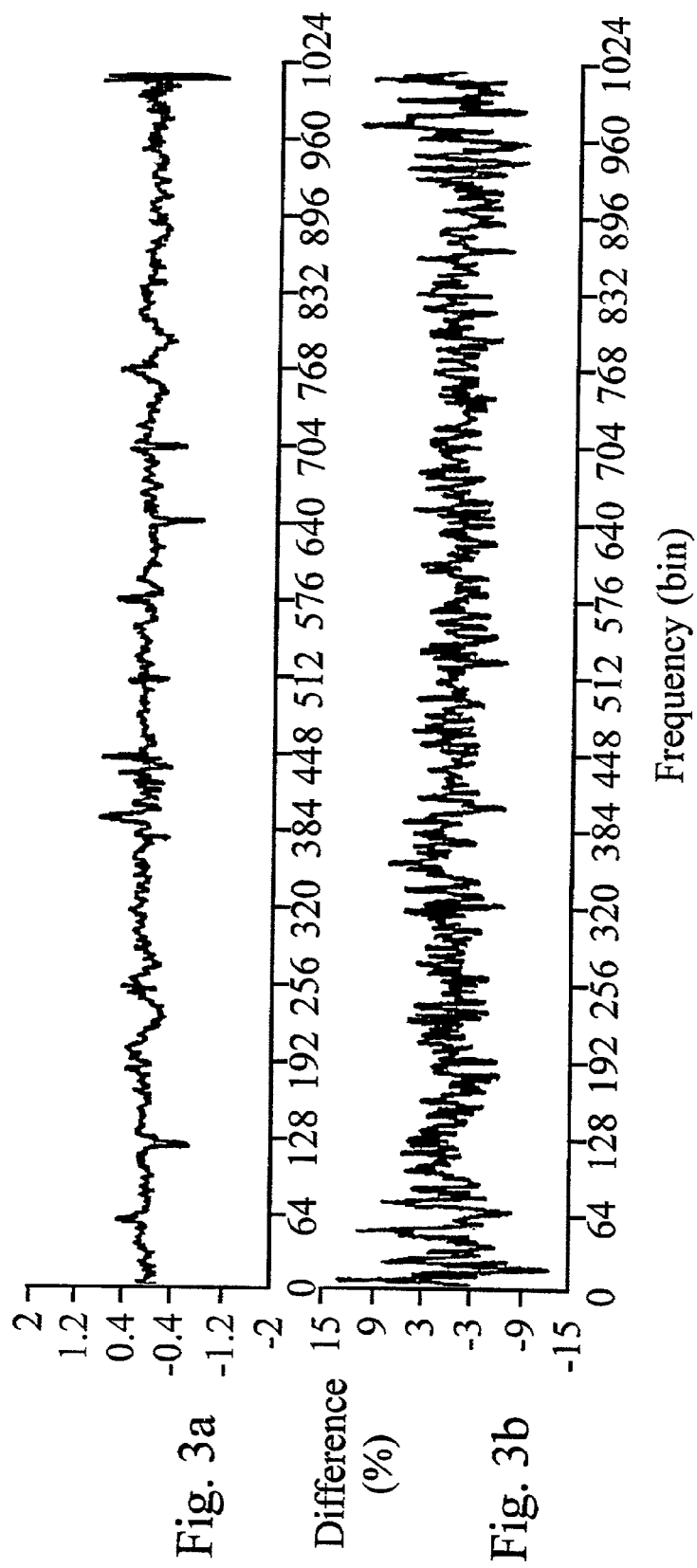

PARALLEL CORRELATOR ARCHITECTURE

This application is a national phase entry of International Application No. PCT/CA01/00038 filed Jan. 17, 2001, which claims priority from U.S. Provisional Patent Application No. 60/176,298 filed Jan. 18, 2000, now abandoned.

FIELD OF THE INVENTION

The invention relates generally to spectral analysis of wide-band sampled signals, in particular to a method and system for real time digital spectral analysis of wide-band sampled signals using parallel processing techniques.

BACKGROUND OF THE INVENTION

Spectral analysis is a well-known analytical tool, which has been used for decades in science and industry to characterize materials, processes and systems based on spectral information. For example, cross-correlation of spectral data provides amplitude and phase information between two signals, which have some common component generated by some common artificial or natural process. In radio astronomy, cross-correlation allows very weak signals from distant astronomical sources to be extracted from strong independent system noise. Amplitude and phase from many different antennae are then used to build an image of the radio source. In network analysis an artificial signal is generated, transmitted through an object under test, and is then cross-correlated with the original signal. This yields the amplitude and phase response as a function of frequency of the tested object. In aperture synthesis radar an object is irradiated by a high power microwave source. Cross-spectral analysis of the microwave reflections from the object's surface is used to produce an image of the object. Auto-correlation of a signal is used in spectrum analysis to find periodic signal components in signals disturbed by random noise. Another field for the application of spectral analysis is in phased array systems such as phased array radar, remote sensing phased array receivers and wide-band phased antennae.

In most of these applications it is desired to use real time digital signal processing to determine the spectrum of a sampled analog signal. Known signal processing systems use mixed analog and digital systems. Furthermore, in current phased array systems analog methods for sub-sample delay interpolation are used. However, analog systems are inherently unstable due to time and temperature variability of analog filters.

Therefore, real time digital processing systems using time-domain de-multiplexing have been recently developed. Unfortunately, these systems require more than an order of magnitude more digital hardware for large array systems than a direct method, as noted below. Furthermore, these systems are often limited by clock rates of the digital equipment that are much lower than the bandwidths of signals to be processed. It is desirable to use digital techniques in real time to determine the spectrum of a sampled analog signal whose bandwidth exceeds the capability of realized digital systems to obtain the spectrum directly. A direct method according to the prior art would require digital processing to occur at clock rates of twice the bandwidth of the signal.

Recent developments in computer technology overcome the limitations of processor clock rates by processing one task on a plurality of processors in parallel in order to process a large amount of data processed in a fraction of the time needed by a one-processor system.

It is, therefore, an object of the invention to provide a method and system based on parallel processing techniques to determine a wide-band spectrum efficiently with arbitrarily high spectral resolution using a processor clock rate that is an arbitrary fraction of the wide-band clock rate.

It is another object of the invention to provide a precision sub-sample digital delay interpolation for phased array and cross-correlation systems.

SUMMARY OF THE INVENTION

In accordance with the present invention there is provided a method for real-time digital spectral analysis of wide-band signals comprising the steps of:

receiving a wide-band signal;

shifting the center frequency of the wide-band signal by a small fraction $\epsilon$ of its bandwidth;

sampling and digitizing the wide-band signal;

processing the digitized wide-band signal using a digital filter; and, decimating the digitally filtered wide-band signal.

In accordance with the present invention there is further provided a method for real-time digital spectral analysis of wide-band signals comprising the steps of:

receiving a wide-band signal;

shifting the center frequency of the wide-band signal by a small fraction $\epsilon$ of its bandwidth;

sampling and digitizing the wide-band signal;

de-multiplexing the digitized wide-band signal into N parallel sample streams;

processing the N parallel sample streams in parallel using N digital FIR filters; and, determining $2^k \cdot N; k=0,1,\ldots$ sub-band signals by decimating the sample stream from each FIR filter by a factor of $2^k \cdot N; k=0,1,\ldots$, wherein only every $2^k \cdot N^{th}; k=0,1,\ldots$ sample is retained and the others are discarded.

In accordance with an aspect of the present invention there is provided a method for cross-correlating de-rotated sub-band signals sub-band by sub-band, the method comprising the steps of:

receiving $2^k \cdot N; k=0,1,\ldots$ pairs of first and second de-rotated sub-band signals at $2^k \cdot N; k=0,1,\ldots$ cross-correlators, wherein each pair is received at a different cross-correlator of the $2^k \cdot N; k=0,1,\ldots$ cross-correlators;

delaying one of the first and second de-rotated sub-band signals with respect to the other in a series of delay intervals at each of the $2^k \cdot N; k=0,1,\ldots$ cross-correlators;

forming the product of the first and the second de-rotated sub-band signals at each of the delay intervals at each of the $2^k \cdot N; k=0,1,\ldots$ cross-correlators;

producing a sub-band cross-correlation result at each of the $2^k \cdot N; k=0,1,\ldots$ cross-correlators by summing the products over a period of time;

transforming each sub-band cross-correlation result at each of the $2^k \cdot N; k=0,1,\ldots$ cross-correlators by means of a Fourier Transform into a cross-spectrum result; and, correcting each cross-power spectral point of each sub-band cross-spectrum result with a sub-band scaling term, a gain differential compensation term, a bandshape correction term and a wide-band power gain term.

In accordance with the aspect of the present invention there is further provided a method for real-time digital spectral analysis of wide-band signals comprising the steps of:

receiving a first and a second wide-band signal;

shifting the center frequency of each of the first and the second wide-band signal by a small fraction $\epsilon_1$ and $\epsilon_2$, respectively, of its bandwidth;

sampling and digitizing the first and the second wide-band signal;

de-multiplexing each of the digitized first and second wide-band signals into first N parallel sample streams and second N parallel sample streams;

processing each of the first and the second N parallel sample streams in parallel using 2·N digital FIR filters;

determining first and second N sub-band signals by decimating the sample stream from each FIR filter by a factor of N, wherein only every $N^{th}$ sample is retained and the others are discarded;

re-quantizating the N sub-band signals by re-scaling and truncating in order to reduce downstream processing load;

phase rotating each of the first and second N sub-band signals by phase $\epsilon_1$ and $\epsilon_2$, respectively, using a digital phase rotator producing first and second N de-rotated sub-band signals;

receiving pairs of the first and second N de-rotated sub-band signals at N cross-correlators, wherein each pair is received at a different cross-correlator of the N cross-correlators;

delaying one of the first and second de-rotated sub-band signals with respect to the other in a series of delay intervals at each of the N cross-correlators;

forming the product of the first and the second de-rotated sub-band signals at each of the delay intervals at each of the N cross-correlators;

producing a sub-band cross-correlation result at each of the N cross-correlators by summing the products over a period of time;

transforming each sub-band cross-correlation result at each of the N cross-correlators by means of a Fourier Transform into a cross-spectrum result;

correcting each cross-power spectral point of each sub-band cross-spectrum result with a sub-band scaling term, a gain differential compensation term, a bandshape correction term and a wide-band power gain term; and, concatenating the N sub-band cross-spectra to obtain a wide-band spectrum.

In accordance with another aspect of the present invention there is provided a method for real-time digital spectral analysis of wide-band signals of a phased array system comprising the steps of:

receiving M wide-band signals from the phased array system;

shifting the center frequency of each of the M wide-band signals by a small fraction $\epsilon_1, \epsilon_2, \ldots, \epsilon_m$, respectively, of its bandwidth;

sampling and digitizing the M wide-band signals;

de-multiplexing each of the digitized M wide-band signals into M·N parallel sample streams;

processing each of the M·N parallel sample streams in parallel using M·N digital FIR filters;

determining M·N sub-band signals by decimating the sample stream from each FIR filter by a factor of N, wherein only every $N^{th}$ sample is retained and the others are discarded;

re-quantizing the M·N sub-band signals by re-scaling and truncating;

complex mixing each of the M·N re-quantized sub-band signals;

90° phase shifting one of two components of each of the complex mixed M·N sub-band signals; and, forming multiple beams by adding same sub-band components of the M·N sub-bands, the same sub-band components being provided by same digital FIR filters.

In accordance with the present invention there is further provided a system for real-time digital spectral analysis of wide-band signals comprising:

a port for receiving a wide-band signal;

means for shifting the center frequency of the wide-band signal by a small fraction $\epsilon$ of its bandwidth;

an A/D converter for sampling and digitizing the wide-band signal;

a de-multiplexer for de-multiplexing the digitized wide-band signal into N parallel sample streams; and, N processors, each processor processing one of the N parallel sample streams by digitally FIR filtering and decimating the sample stream in order to determine a sub-band signal.

BRIEF DESCRIPTION OF FIGURES

Exemplary embodiments of the invention will now be described in conjunction with the following drawings, in which:

FIG. 3a is a diagram illustrating percent difference between full band and sub-band correlation for identical noise generator seeds;

FIG. 3b is a diagram illustrating percent difference between full band and sub-band correlation for different noise generator seeds;

DETAILED DESCRIPTION OF PREFERRED EMBODIMENTS

The wideband interferometric digital architecture WIDAR according to the present invention provides efficient wide-band digital signal processing at lower, more cost effective system clock rates using parallel processing techniques. Further attributes of the invention are high spectral resolution on wide-bands and the ability to quickly provide a much higher spectral resolution on smaller arbitrary sub-bands using the same data. Although, the WIDAR technique is generally applied to signal processing in real-time, it is not specifically required for the signals to be real-time. For example, since the WIDAR technique reduces the number of operations required it can make non-real time analysis on a general purpose computer feasible for some applications.

In the following three applications of the invention a cross-power analyzer, an auto-power analyzer and a phased array system will be disclosed. The mathematical background of the invention will be explained with respect to the cross-power analyzer. It will become evident to a person of skill in the art that the restriction to the cross-power analyzer does not imply a loss of generality and the same mathematical background can be easily applied to other applications.

Figure 1A:
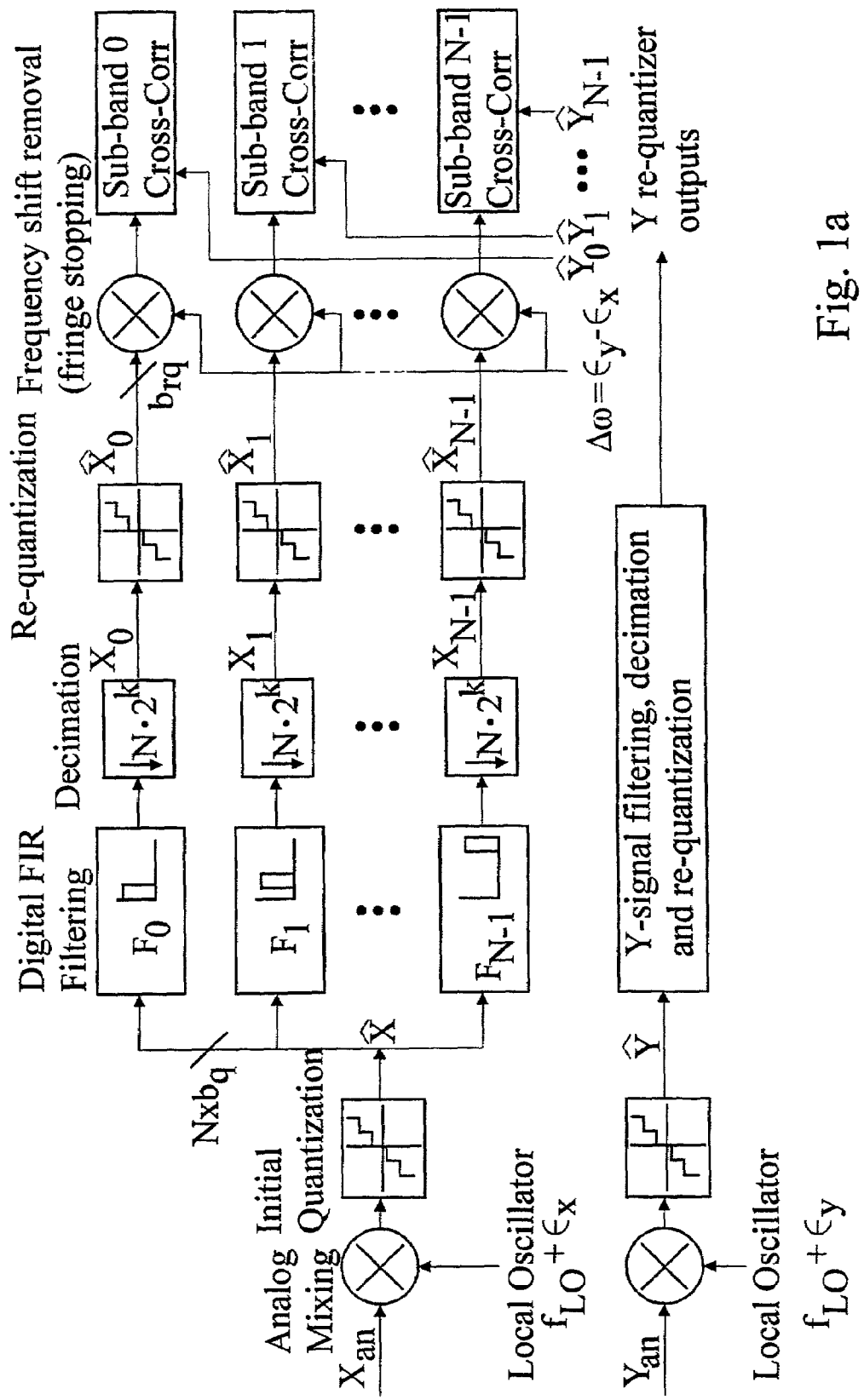
FIG. 1a is a simplified block diagram of a method according to the invention for spectral analysis of a wide band signal.
Figure 1B:
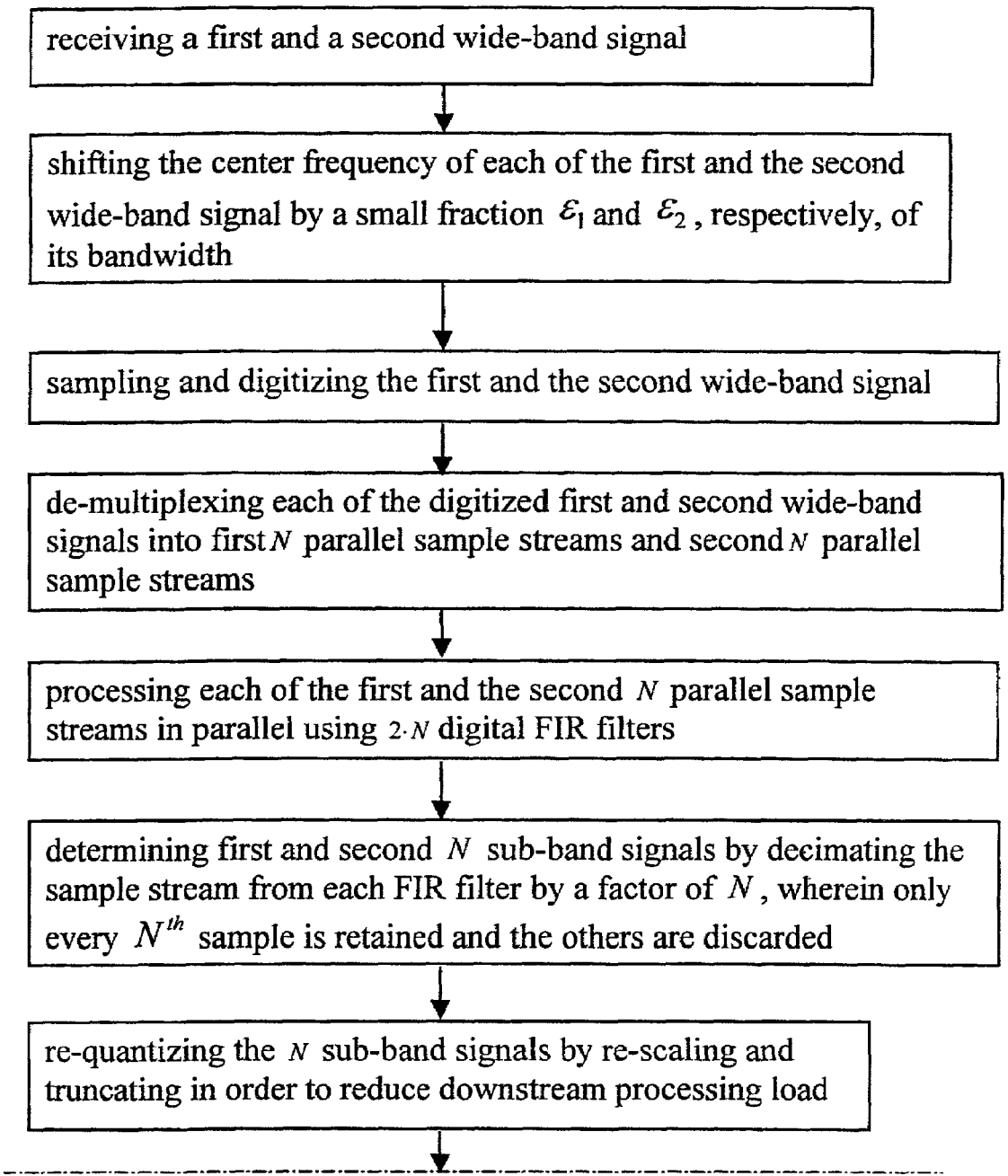
FIG. 1b is a simplified flow diagram of a method according to the invention for spectral analysis of a wide band signal.
Figure 1B:
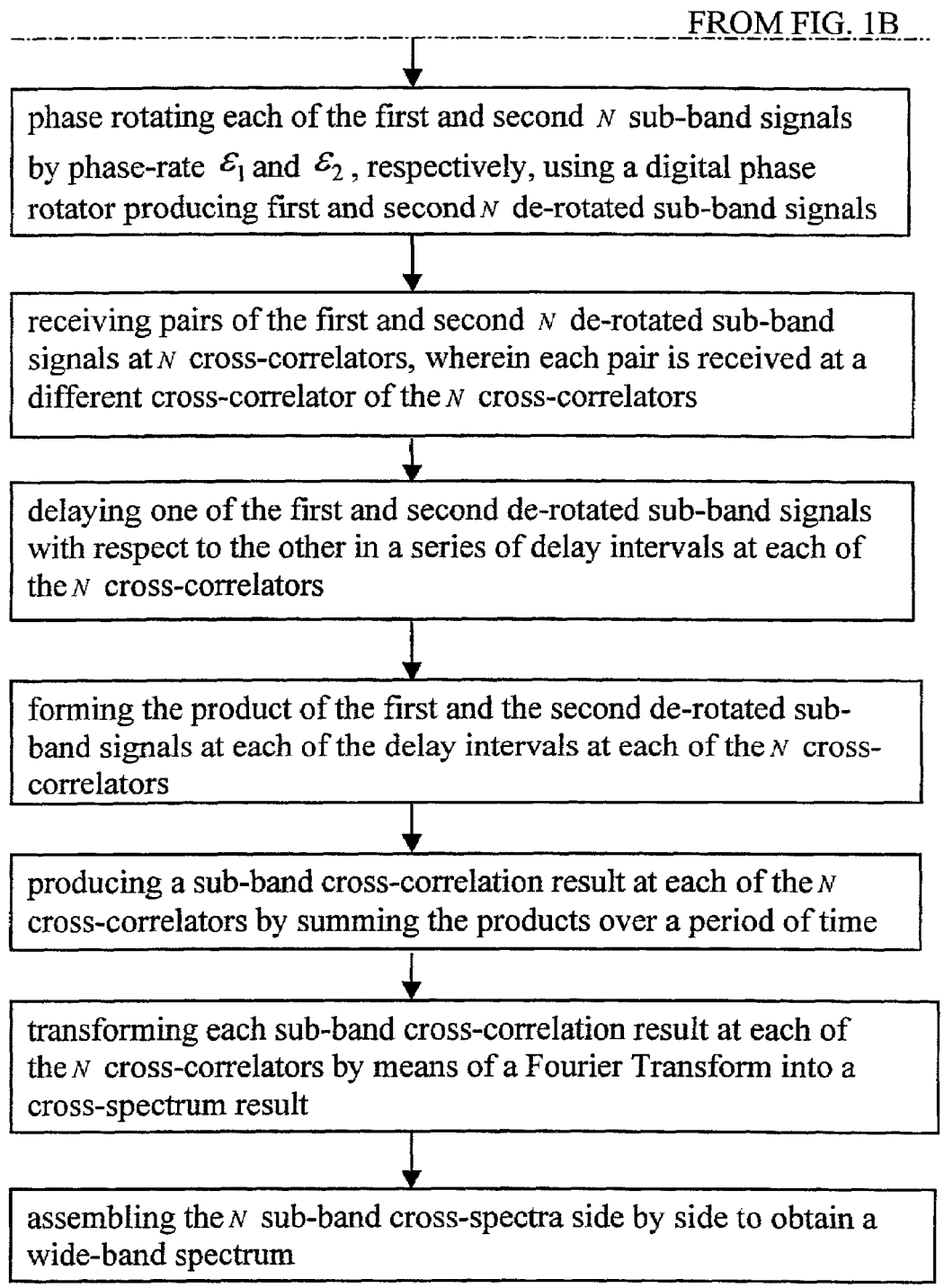
Figure 1C:
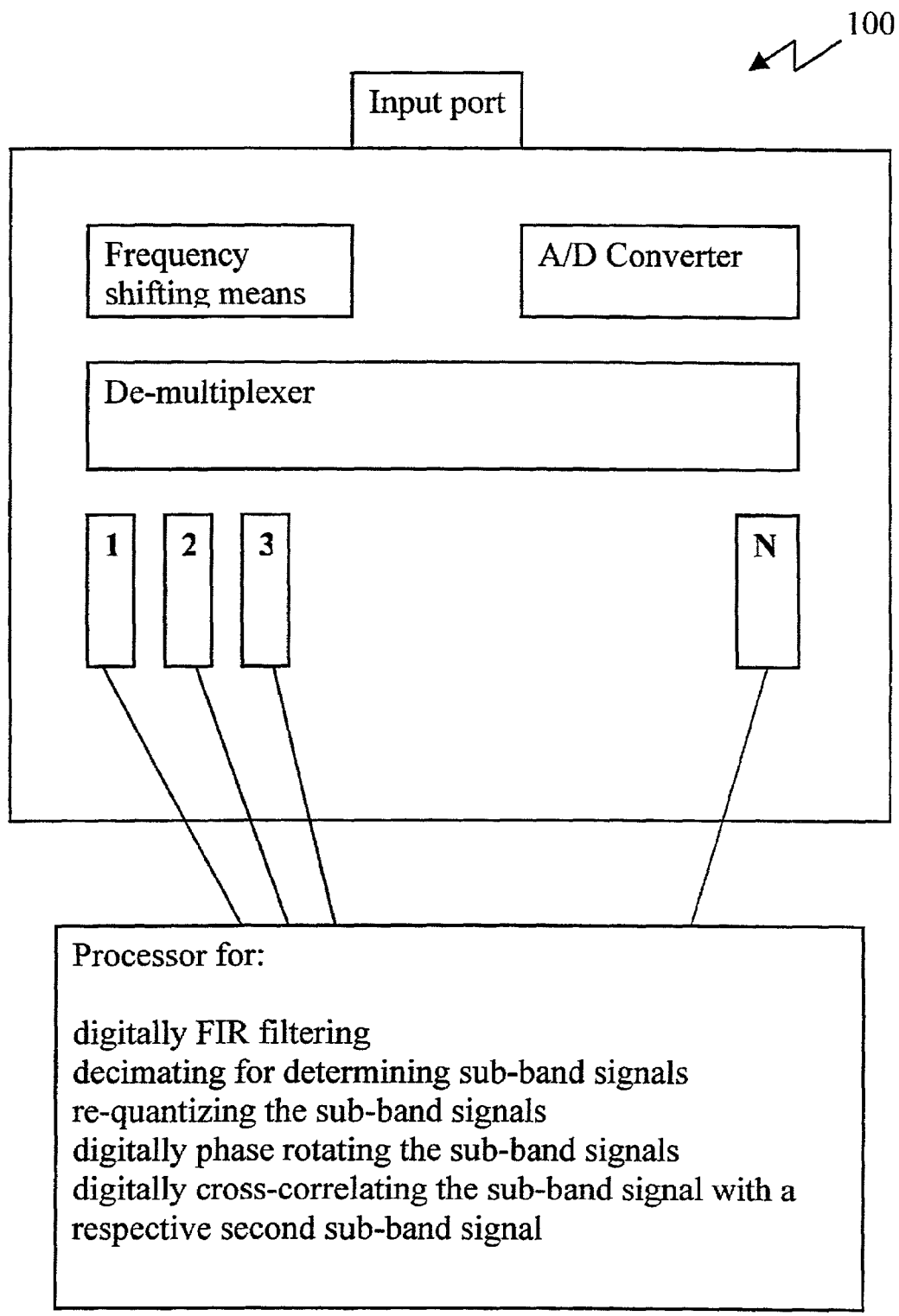
FIG. 1c is a simplified block diagram of a system according to the invention for spectral analysis of a wide band signal.

Referring to FIGS. 1a and 1b a simplified block diagram as well as a simplified flow diagram of a method for cross-power analysis according to the present invention is shown. A respective system 100 according to the present invention is illustrated in FIG. 1c, showing processing means for processing one analog wide-band input signal. For the cross-spectral signal analysis two analog wide-band input signals $X_{an}$ and $Y_{an}$ are provided to two systems 100, respectively, each system 100 for processing one signal. Final cross-correlation is then performed on one of the two systems.

In a first processing step the center frequency of the signal $X_{an}$ is shifted by a small fraction of its bandwidth $\epsilon$ using an analog mixer and a local oscillator. The wide-band signal is sampled and digitized with a sample rate $f_s$ of at least twice the bandwidth of the wide-band signal $B_w$ (Nyquist rate). Optionally, a digital single-sideband mixer may be used to perform the frequency shift digitally after the A/D conversion of the signal. The sampled signal is de-multiplexed into N parallel sample streams for parallel processing. Although the step of de-multiplexing is generally used in applications of this method it is not strictly required. The N parallel sample streams are sent in parallel to each of N digital filters. The bandwidth of each digital filter is approximately 1/N of the bandwidth of the wide-band signal. Each of the digital filters may have a different tap weight. Preferably, digital Finite Impulse Response (FIR) filters such as poly-phase decimating FIR filters are used. The sample stream from each digital filter is decimated by a factor of N, i.e. only every $N^{th}$ sample is retained and the others are discarded. The decimated sample streams are called sub-band signals. In a following step the resolution of the sub-band signals is reduced by re-scaling and truncating the sub-band signals in order to reduce downstream processing load. This step of re-quantization is an optional but not necessary feature of the processing. In a following step the sub-band signals are phase rotated by phase $\epsilon$ using a digital phase rotator. Two output signal streams being in quadrature with one another are produced for the sample stream from each FIR filter. The pair of signals is called the de-rotated sub-band signal. There are N de-rotated sub-band X signals.

The processing of the Y signal is analog, resulting in N de-rotated sub-band Y signals, except that the tap-weights of the FIR filters may be different.

Figure 2A:
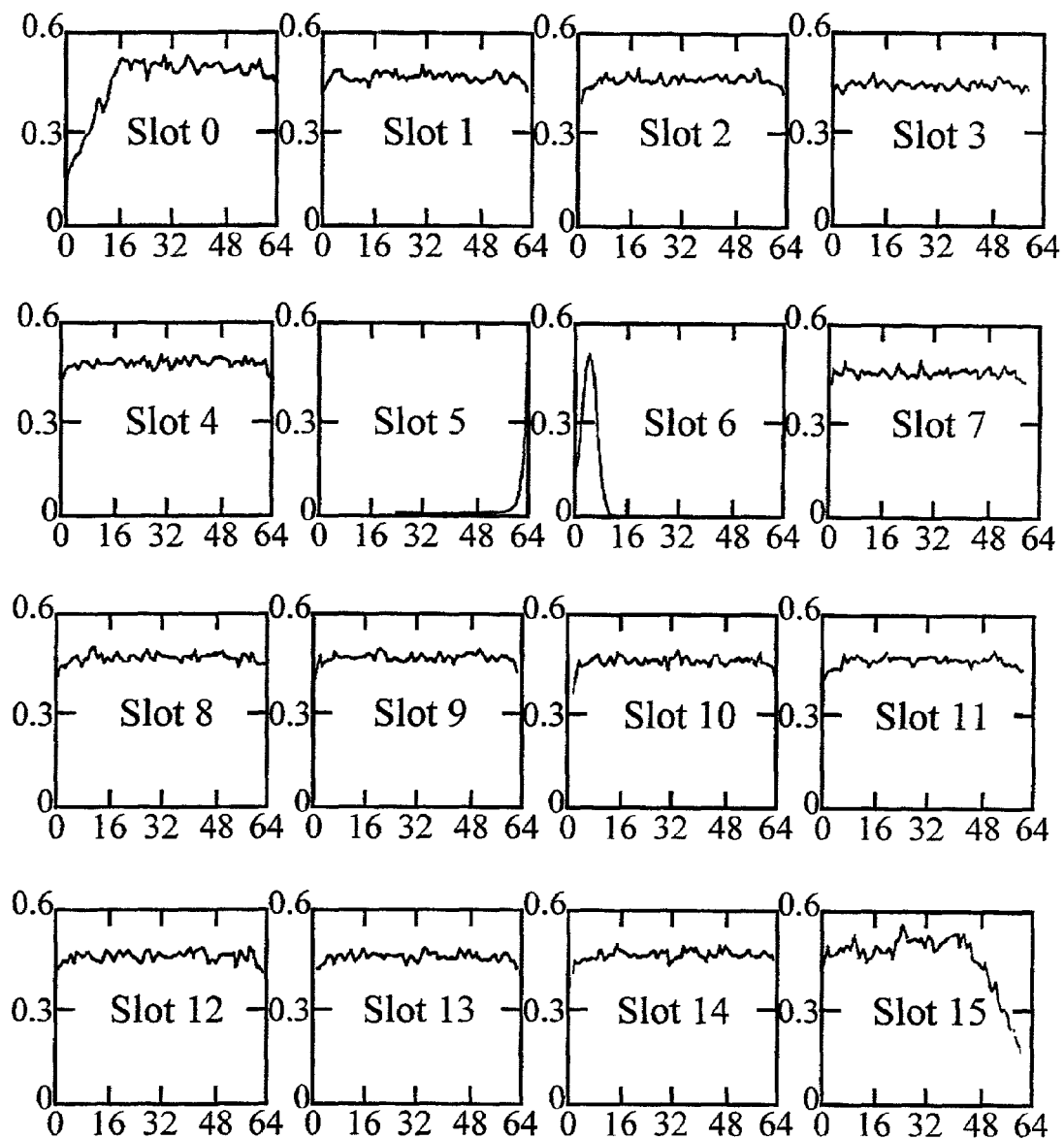
FIG. 2a is a diagram illustrating correlated sub-band signals using the method shown in FIGS. 1a and 1b.
Figure 2B:
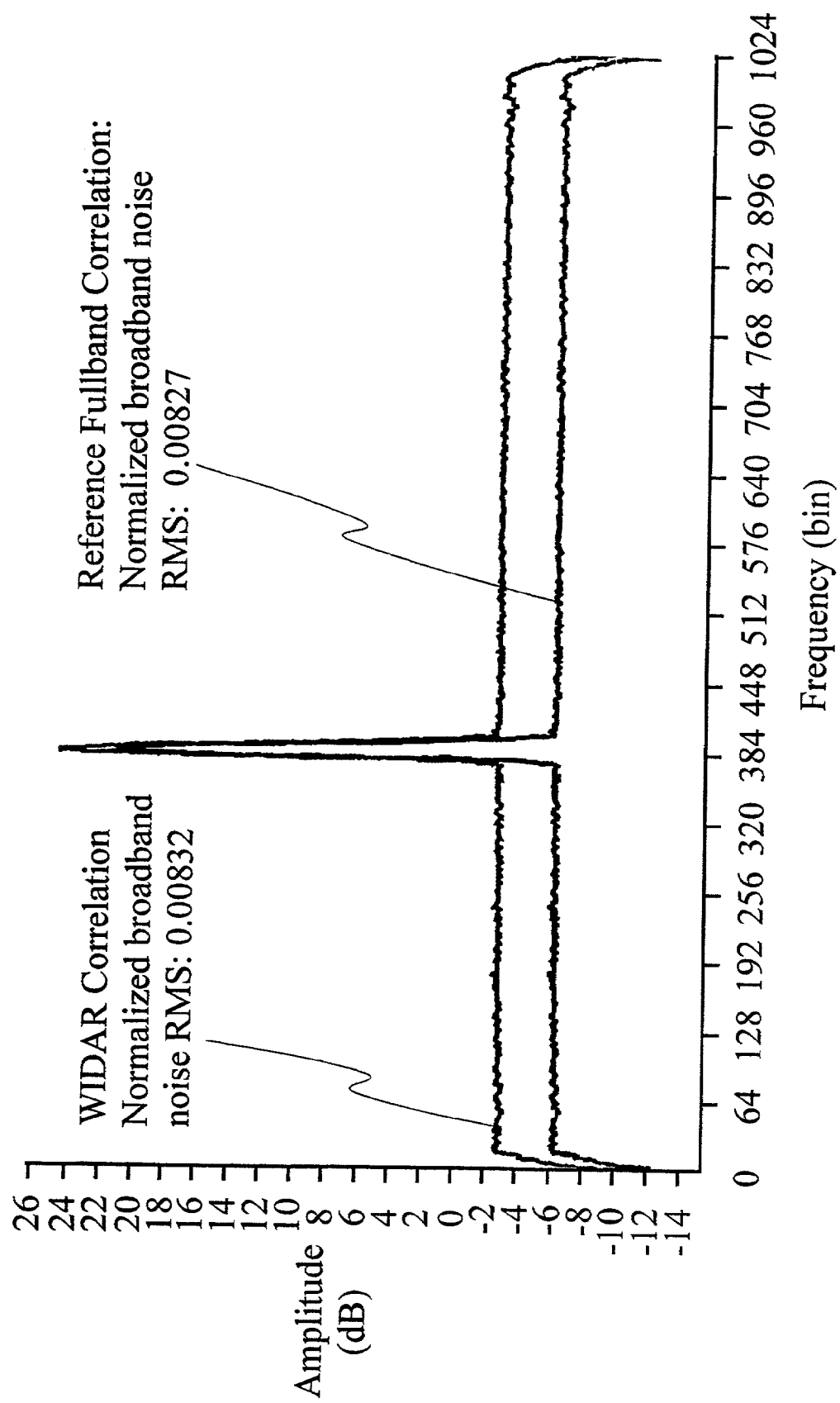
FIG. 2b is a diagram illustrating a comparison of a correlated wide-band spectrum using the sub-band correlation method according to the invention and a full band correlation method of the prior art.

Each of the N de-rotated sub-band X and Y signals are cross-correlated sub-band by sub-band. The cross-correlators delay one of the X or the Y signals with respect to the other in a series of delay intervals. The delay intervals are equivalent to one sample-interval of a sub-band signal. At each of these delays the correlator forms the product of the X and Y signals in a multiplier. The output of each multiplier is summed over a period of time—integration time—producing a sub-band cross-correlation result. Each sub-band cross-correlation result is transformed into a cross-spectrum result by means of a Fourier Transform, which is performed after each integration time. The cross-correlators are implemented in system 100 as a software version executed by the N processors. FIG. 2a shows an example of a cross-spectrum result for N=16 sub-bands. The sub-band cross-spectra are band flattened and scaled by a cross spectrum weighting function. The wide-band spectrum is then obtained by assembling the band flattened and scaled sub-band cross-spectra side-by side as shown in FIG. 2b.

Optionally, the sub-band signals may be phase rotated at any time before, during or after the cross-correlation.

Further optionally, digital sub-sample delay interpolation is used to provide precision delay intervals to the sub-band signals. It provides fully digital $$\frac{1}{N}$$

sample delay interpolation for delay the delay intervals. After initial quantization, digital delay tracking to ±0.5 samples of delay is performed with simple integral delays. This imposes a phase slope across the full band that is 0 at DC and varies between $$\pm \frac{\pi}{2}$$

at the highest frequency. After filtering and decimation the phase excursion in each sub-band is only $$\pm \frac{\pi}{2N}\left(\pm\frac{0.5}{N} \text{ samples of delay}\right)$$

plus a phase offset that changes with delay. The phase offset in each sub-band can be removed with its fringe stopper. If N=16, then $$\frac{1^{th}}{16}$$

sample delay interpolation has been achieved.

Alternatively, the correlator is implemented as a FX correlator. In this correlator, the de-rotated sub-band signals are Fourier transformed in real time to the frequency domain using, for example, Fast Fourier Transformation (FFT). The real-time spectral points are then complex cross-multiplied and time-averaged to yield the complex cross-power spectrum.

A digital FIR filter has a predictable amplitude and phase response. The amplitude response is the Fourier Transform of its tap coefficients provided the internal word length of the realized filter is sufficiently long. For a cosine symmetric FIR filter phase is linear. If the integer sample delay through the filter is removed, phase is essentially zero down to the −15 dB point in the transition band of a bandpass filter. These are the important qualities of the FIR filters for the present invention.

If the sampled signal is de-multiplexed by a factor of N decimation of the output of each FIR filter by the same factor (or $2^k \cdot N; k=0,1,\ldots$) yields an efficient parallel architecture that has to operate only at the decimated sample rate. Normally, k is set to be zero but can be non-zero if it is desired to further split the band into smaller sub-bands than produced by the de-multiplexing. For simplicity, k is set to be zero for the rest of the disclosure. If a FIR filter has tap coefficients producing a bandpass of $$\frac{1}{N}$$

of the full band aligned on sub-band boundaries of $$\frac{n}{N}$$

(n=0,1, . . . ,N−1), decimation by a factor of N yields a baseband signal with bandwidth and sample rate reduced by a factor of N, as is shown in Crochiere, R. E., Rabiner, T. R. "Multirate Digital Signal Processing", Prentice Hall, N.J., 1983. If n is odd the signal has an opposite frequency sense and is corrected by changing the sign of alternate samples. Any finite-length FIR filter has a finite transition band. After decimation, the transition band outside the sub-band boundaries will suffer aliasing, which causes signals to falsely appear as aliased signals within the sub-band. Shifting all spectral features in the wide-band spectrum with a frequency shift $\epsilon$ prevents false correlation of the aliased signals. $\epsilon$ is an arbitrary, but small, frequency shift. However, $\epsilon$ has to be large enough to cause de-correlation in less time than the integration time. The aliased signals are quickly suppressed in the output of the correlator depending upon the length of the integration time and the value of $\epsilon$. The rate of suppression is $1/(2\epsilon T)$, wherein T is the integration time. Therefore, false correlated signals can be suppressed by an arbitrary amount. If greater suppression is needed, the value of $\epsilon$ can be varied in a quasi-random way during an integration period. If this frequency shift technique is not applied aliased signals will appear and in some applications aliased "quantization noise" will also appear in the wide-band spectrum.

In the following it will be described how correlated sub-band data are corrected to allow concatenation with other corrected sub-band data in order to obtain a wide-band spectrum. Further details are disclosed by the inventors in Carlson, B. R., Dewdney, B. E. "Efficient wideband digital correlation", Electronics Letters, IEE, Vol. 36 No. 11, pp 987, May 25, 2000.

The correction of the correlated sub-band data can be expressed as:

$$\rho_{nf} = \rho_{onf} \cdot \frac{P_{XY_n}}{P_{XY_T}} \cdot P_{XYFIR_T} \cdot \frac{S_{XYFIRideal_{nf}}}{S_{XYFIR_{nf}}} \cdot P_{XYideal_T} \quad (1)$$

$\rho_{nf}$ is a final corrected cross-power spectral point at frequency bin f of the $n^{th}$ sub-band from signals X and Y. $\rho_{onf}$ is a cross-power spectral point produced by the $n^{th}$ sub-band correlator (Fourier Transform of correlation of correlation coefficients normalized to $n^{th}$ sub-band X and Y re-quantizer output levels).

$$\frac{P_{XY_n}}{P_{XY_T}}$$

is a sub-band scaling term and scales each sub-band correlator output to its correct amplitude relative to other sub-bands and also to the initial quantizer output. $P_{XYFIR_T}$ is a gain differential compensation term and removes any overall gain differences in sub-band FIR filters inherently present in the denominator of the previous term.

$$\frac{S_{XYFIRideal_{nf}}}{S_{XYFIR_{nf}}}$$

is a bandshape correction term and corrects for any sub-band FIR filter shape that is not the same as the ideal filter shape. Finally, $P_{XYideal_T}$ is a wide-band power gain term that simply scales the output to the desired wide-band ideal filter gain.

$P_{XY_n} = \sqrt{\langle x_n^2 \rangle \langle y_n^2 \rangle}$ is the geometric mean of the power into the $n^{th}$ sub-band X and Y re-quantizers. Each power must be measured. The FIR filter tap coefficients across all sub-bands must be explicitly normalized to a common denominator, usually their maximum, for $\langle x_n^2 \rangle$ and $\langle y_n^2 \rangle$ to be meaningful.

$$P_{XY_T} = \left[ \prod_{n=0}^{N-1} P_{XY_n} \right]^{\frac{1}{N}}$$

is the geometric mean of the power into all re-quantizers.

$$P_{XYFIR_T} = \left[\prod_{n=0}^{N-1} K_{FXY_n}\right]^{\frac{1}{N}}$$

is the calculated relative gain of the X and Y FIR filters compared to the ideal (required) filters, wherein $K_{FXY_n} = P_{XYFIR_n}/P_{XYFIRideal_n} \cdot P_{XYFIR_n}$ is the total cross-power of the $n^{th}$ sub-band filter including aliased power. $P_{XYFIRideal_n}$ is the total cross-power of the ideal sub-band filter, which has no aliasing. $S_{XYFIR_{nf}}$ is the cross-power sub-band filter shape—the product of the Fourier Transform of the $n^{th}$ X and Y sub-band FIR filter tap coefficients. $S_{XFIRideal_{nf}}$ is the desired $n^{th}$ sub-band filter shape. $P_{XYideal_T}$ is the total power gain of the ideal filter function.

In the following equation (1) will be simplified in order to provide some insight into the processing of the sub-band correlators. For simplicity, it is useful to re-write equation (1) to consider only total power corrections in each sub-band and, for now, ignore the individual spectral corrections $S_{XYFIRideal_{nf}}/S_{XYFIR_{nf}}$. Equation (1) can thus be re-written:

$$\rho_n = \rho_{on} \cdot \frac{P_{XY_n}}{P_{XY_T}} \cdot P_{XYFIR_T} \cdot P_{XYideal_T} \quad (2)$$

In equation (2) $\rho_{on}$ is the normalized sub-band correlation coefficient:

$$\rho_{on} = \frac{\langle \hat{x}_n \hat{y}_n \rangle}{\sqrt{\langle \hat{x}_n^2 \rangle \langle \hat{y}_n^2 \rangle}}$$

The above equation assumes that there is a linear relationship between the raw correlator output $<r_{on}>$ and the normalized correlator output $\rho_{on}$. For coarsely quantized signals, this will not generally be true, however the raw correlator output can be normalized and linearized using a suitable algorithm. In fact, 4-bit quantization is nearly linear and there is little error if the above equation is used directly.

The second term in equation (2) is the sub-band normalization to the input power into the re-quantizers and becomes in its expanded form:

$$\frac{P_{XY_n}}{P_{XY_T}} = \frac{\sqrt{\langle x_n^2 \rangle \langle y_n^2 \rangle}}{\left(\prod_{n=0}^{N-1} \langle x_n^2 \rangle \langle y_n^2 \rangle\right)^{\frac{1}{2N}}}$$

where there are N sub-bands. Note that the denominator in the above expression is the geometric mean of the power in each sub-band before re-quantization. Alternatively, the arithmetic mean $$\left(\frac{1}{N} \cdot \left[\sum_{n=0}^{N-1} \sqrt{\langle x_n^2 \rangle \langle y_n^2 \rangle}\right]\right)$$

can be used as long as $P_{XYFIR_T}$ is calculated in a similar fashion. The arithmetic mean generally yields an answer that is the same as a full-band correlator, while the geometric mean generally yields a more correct answer in the presence of high dynamic range signals.

The term $P_{XYFIR_T}$ in equation (2) is the geometric mean of the calculated cross-power gain of all actual sub-band FIR filters relative to the calculated cross-power gain of an ideal filter:

$$P_{XYFIR_T} = \left[\prod_{n=0}^{N-1} K_{FXY_n}\right]^{\frac{1}{N}}$$

where:

$$K_{FXY_n} = \frac{P_{XYFIR_n}}{P_{XYFIRideal_n}}$$

For an ideal filter with a flat bandpass, the gain is $$\frac{1}{N}$$

since only $$\frac{1}{N}$$

of the power in the total band is passed by the sub-band filter. The gain $G_{Fn}$ of the real filter is some factor $K_{Fn}$ from the ideal and is:

$$G_{FX_n} = \frac{K_{FX_n}}{N}, \quad G_{FY_n} = \frac{K_{FY_n}}{N}$$

Thus:

$$\frac{P_{XYFIR_n}}{P_{XYFIRideal_n}} = \frac{\sqrt{G_{FX_n} G_{FY_n}}}{\sqrt{\left(\frac{1}{N}\right)^2}} = K_{FXY_n}$$

as stated above.

The final term in equation (2) $P_{XYideal_T}$ is the total cross power gain of the ideal filter transfer functions. This must be calculated as either the geometric mean or arithmetic mean of the power from each sub-band's ideal filter function such that it cancels out the gain inherent in the measurement and subsequent calculation of $P_{XY_T}$. A more exact expression for $P_{XYideal_T}$ (assuming a geometric mean calculation) is:

$$P_{XYideal_T} = \left(\prod_{n=0}^{N-1} P_{Xideal_n} \cdot P_{Yideal_n}\right)^{\frac{1}{2N}}$$

-continued where:

$$P_{Xideal_n} = \left(\frac{1}{F}\sum_{f=0}^{F-1} S_{XFIRideal_f}\right)_n, \; P_{Yideal_n} = \left(\frac{1}{F}\sum_{f=0}^{F-1} S_{YFIRideal_f}\right)_n,$$

F being the number of frequency points in the ideal filter sub-band, and $S_{XFIRideal_{fn}}$ is the ideal filter amplitude at each spectral point f in sub-band n of the X signal (similarly for Y).

Substituting the above expressions into equation (2) and, for now, omitting the term $P_{XYideal_T}$ yields:

$$\rho_n = \frac{\langle \hat{x}_n \hat{y}_n \rangle}{\sqrt{\langle \hat{x}_n^2 \rangle \langle \hat{y}_n^2 \rangle}} \cdot \frac{\sqrt{\langle x_n^2 \rangle \langle y_n^2 \rangle}}{(\prod_{n=0}^{N-1}\langle x_n^2 \rangle \langle y_n^2 \rangle)^{\frac{1}{2N}}} \cdot \left[\prod_{n=0}^{N-1} K_{FXYn}\right]^{\frac{1}{N}}$$

with:

$$\hat{x} = x_n \cdot \sqrt{G_{qrxn}},$$

wherein $G_{qrxn}$ is the re-quantizer power gain of the sub-band n of the X signal, and $$x_n = \hat{x} \cdot \sqrt{G_{FXn} G_D} = \hat{x} \cdot \sqrt{K_{FXn}},$$

similarly for the Y signal.

The square roots of the gains in the above equations are due to the chosen convention that the gains are expressed in terms of power and the signals are in terms of voltage. Additionally, each decimator has a gain of $G_D = N$ since decimation reduces the denominator in the discrete-time calculation of $\langle x_n^2 \rangle$ compared to $\langle \hat{x}^2 \rangle$ in the frequency domain convolution of the bandpass signal with the decimation function. Substituting these expressions into equation (2) yields:

$$\rho_n = \frac{\langle \hat{x}_n \hat{y}_n \rangle}{\sqrt{\langle (x_n\sqrt{G_{qrxn}})^2 \rangle \langle (y_n\sqrt{G_{qryn}})^2 \rangle}} \cdot$$

$$\frac{\sqrt{\langle x_n^2 \rangle \langle y_n^2 \rangle}}{\left(\prod_{n=0}^{N-1} \langle (\hat{x}\sqrt{K_{FXn}})^2 \rangle \langle (\hat{y}\sqrt{K_{FYn}})^2 \rangle \right)^{\frac{1}{2N}}} \cdot \left[\prod_{n=0}^{N-1} K_{FXYn}\right]^{\frac{1}{N}}$$

Since the re-quantizer gains $G_{qrxn}$ and $G_{qryn}$ as well as the filter gain deviations from ideal $K_{FXn}$ and $K_{FYn}$ are not statistically variant, the above expression becomes:

$$\rho_n = \frac{\langle \hat{x}_n \hat{y}_n \rangle}{\sqrt{G_{qrxn} G_{qryn}} \sqrt{\langle x_n^2 \rangle \langle y_n^2 \rangle}} \cdot \frac{\sqrt{\langle x_n^2 \rangle \langle y_n^2 \rangle}}{\sqrt{\langle \hat{x}^2 \rangle \langle \hat{y}^2 \rangle} \left[\prod_{n=0}^{N-1} K_{FXYn}\right]^{\frac{1}{N}}} \cdot \left[\prod_{n=0}^{N-1} K_{FXYn}\right]^{\frac{1}{N}},$$

which after including $P_{XYideal_T}$ simplifies to:

$$\rho_n = \frac{\langle \hat{x}_n \hat{y}_n \rangle}{\sqrt{\langle \hat{x}^2 \rangle \langle \hat{y}^2 \rangle}} \cdot \frac{1}{\sqrt{G_{qrxn} G_{qryn}}} \cdot P_{XYideal_T} \quad (3)$$

From equation (3) it is obvious that the sub-band correlator output is effectively normalized to the power out of the initial re-quantizer just like a full band correlator would be and that the correct $\rho_n$ can be obtained if the re-quantizer gains are known. The re-quantization gains are dynamic and ensure that near optimum quantization occurs. More insight is obtained by considering the response of equation (3) to changes in the system. Since the raw sub-band correlator output $\langle \hat{x}_n \hat{y}_n \rangle$ is inherently scaled to the power into the re-quantizer, any change in that power level due to an increase in uncorrelated signal (for example, by using a filter with more aliased power in its particular sub-band) will result in a reduction in $\langle \hat{x}_n \hat{y}_n \rangle$. The re-quantizer gain will drop a compensating amount and $\rho_n$ will remain constant. Therefore, the correlated amplitude is independent of transition band aliasing. Additionally, if the ideal filter gain increases (for example, if more gain is wanted) without adding any more uncorrelated noise, the re-quantizer gains will drop and $\rho_n$ will remain constant. In this case the $P_{XYideal_T}$ term ensures that the final output will change with the filter gain change to yield the correct result.

In the previous section a simplified equation considering the total power in each sub-band was derived. Now, the second last term of equation (1) will be included to consider its effect. Equation (3) including this term is:

$$\rho_{nf} = \frac{\langle \hat{x}_n \hat{y}_n \rangle}{\sqrt{\langle \hat{x}^2 \rangle \langle \hat{y}^2 \rangle}} \cdot \frac{1}{\sqrt{G_{qrxn} G_{qryn}}} \cdot \frac{S_{XYFIRideal_{nf}}}{S_{XYFIR_{nf}}} P_{XYideal_T} \quad (4)$$

wherein the cross spectral power at each spectral point f within each sub-band n is considered.

The band shape correction term:

$$\frac{S_{XYFIRideal_{nf}}}{S_{XYFIR_{nf}}}$$

is a result calculated from the Fourier Transform of the implemented FIR filter tap coefficients and from the required ideal FIR filter frequency response, not including aliasing and just using the spectral points f within a particular sub-band. Since it is generally not possible for the implemented FIR filter response to be precisely equal to the ideal FIR filter response, this term provides a correction that can be applied—post correlation—to each spectral point to correct the difference. For best interferometer array phase closure performance all of the spectral corrections should be close to unity or at least symmetric about their respective sub-band center frequencies.

In the following the effect of the spectral corrections in equation (4) on the response of the system will be considered. For example, if $S_{XYFIR_{nf}}$ is increased by a factor of 2 at each frequency bin f (a purposely bad fit of the actual filter response to the ideal filter response $S_{XYFIRideal_{nf}}$), the input power to the re-quantizer will increase by a factor of 2. The re-quantizer gains ($G_{qrxn}$ and $G_{qryn}$) will respond by dropping by a factor of 2 and $\rho_{nf}$ will remain constant. This is because simply the level into the re-quantizer is changed. The same result will be obtained even if the difference between the actual FIR filter amplitude and the ideal FIR filter amplitude is not the same at every frequency bin f, $\rho_{onf}$ always scales to the total power into the re-quantizer, is corrected by a measured concomitant amount, and then is corrected at each frequency bin by a calculated ratio. The ability to correct for virtually any FIR filter fit is an important attribute since it is generally true that the FIR filter fit to the required ideal FIR filter shape will be different in each frequency bin.

Figure 4A:
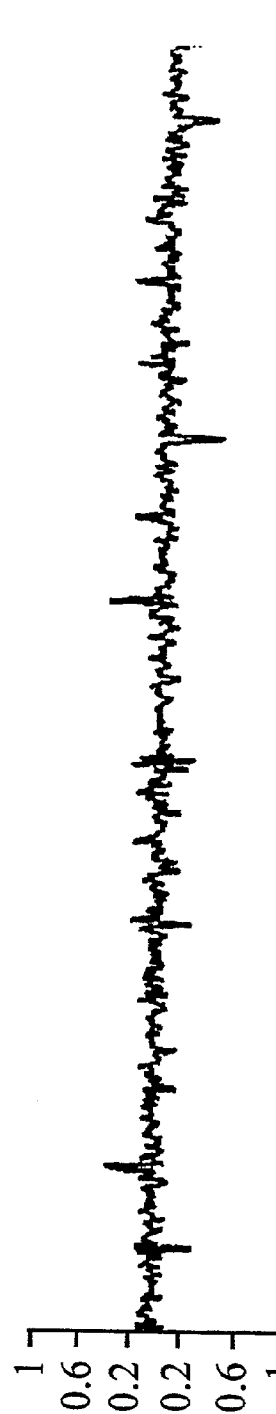
FIG. 4a is a diagram illustrating phase difference between full band and sub-band correlation for identical noise generator seeds.
Figure 4B:
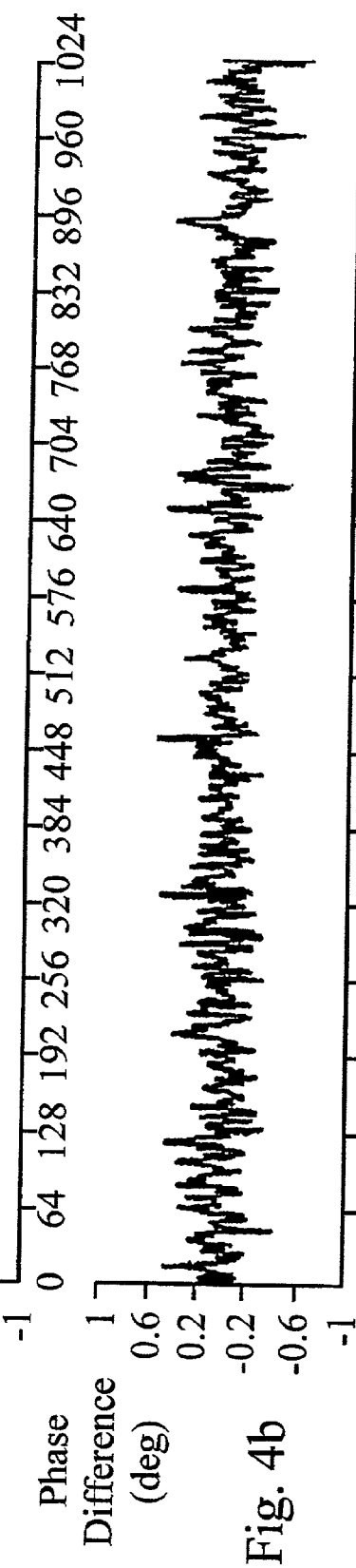
FIG. 4b is a diagram illustrating phase difference between full band and sub-band correlation for different noise generator seeds.

For comparing the performance of the WIDAR with a full band correlator the ideal filter has unity gain across the sub-band and is zero elsewhere. FIGS. 2a and 2b show simulation results of a 2 GHz broadband signal containing a strong but relatively narrowband signal simulating an astronomical maser. N=16 was chosen with 4-bit initial quantization and 4-bit re-quantization yielding a 250 MHz sub-band sample rate. 1023-tap FIR filters were used with a sub-band boundary cutoff of −1.2 dB, a flat passband, and a reject band attenuation of −50 dB. The narrowband signal is slightly offset from a sub-band boundary. The bottom trace in FIG. 2b is the full band correlation, and the top trace is the sub-band correlation comprising N=16 concatenated sub-bands, which are shown in FIG. 2a. Three-level fringe stopping was used in the WIDAR sub-band correlators and a frequency shift of 24 kHz was introduced in both cases. The full band correlation amplitude is reduced because it is inherently normalized to the total power into the quantizers, a significant fraction of which is the narrowband signal in this case. The correlation of the WIDAR sub-band correlator according to the invention was set to the correct broadband amplitude by normalizing to one or more sub-band's $P_{XYn}$ clear of narrowband signals—since only the correlation of a clear band yields the correct broadband result. For example, $P_{XY2}$ replaces $P_{XY_T}$ and $K_{FXY2}$ replaces $P_{XYFIR_T}$ in equation (1). FIG. 3a shows the results of a channel-by-channel comparison of the WIDAR sub-band correlator according to the invention and the full band correlator using identical noise. As expected, there are peaks at the sub-band boundaries due to aliased independent noise from the transition band. These peaks are a very small fraction of the actual noise levels. A statistical comparison of noise performance is obtained using independent noise as shown in FIG. 3b. FIGS. 4a and 4b illustrate the phase comparison for the same two cases. The sub-band correlation broadband level was found to be within −0.7% of the expected level (0.5). This comparison clearly illustrates that the aliased signal decorrelates.

Cross-power analyzers are employed when it is desired to obtain both amplitude and phase between two signals, which have some common component, i.e. which were generated by some common artificial or natural process. In radio astronomy cross power analysis along with sufficient averaging time allows very weak signals from distant astronomical sources to be extracted from strong independent system noise. Amplitude and phase from many different antennae are then used to build an image of the radio source. Other applications for cross-power analyzers include network analysis and aperture synthesis radar. In network analysis an artificial signal is generated, transmitted through the tested object and is then cross-correlated with the original signal. This yields the amplitude and phase response as a function of the frequency of the tested object. The tested object could be a circuit or some "black box" responding in different ways at different frequencies. In aperture synthesis radar an object is irradiated by a high power microwave transmitter in order to image the object. One complication with this technique is that microwave reflections from many different parts of the object may be coherent rather than incoherent making it difficult to reconstruct an image. Here, high spectral resolution on wide-bands would significantly improve the imaging process. In all these applications the WIDAR technique according to the invention allows sampler frequencies to be much higher than the downstream hardware can process in real time providing a significantly higher resolution.

Figure 5:
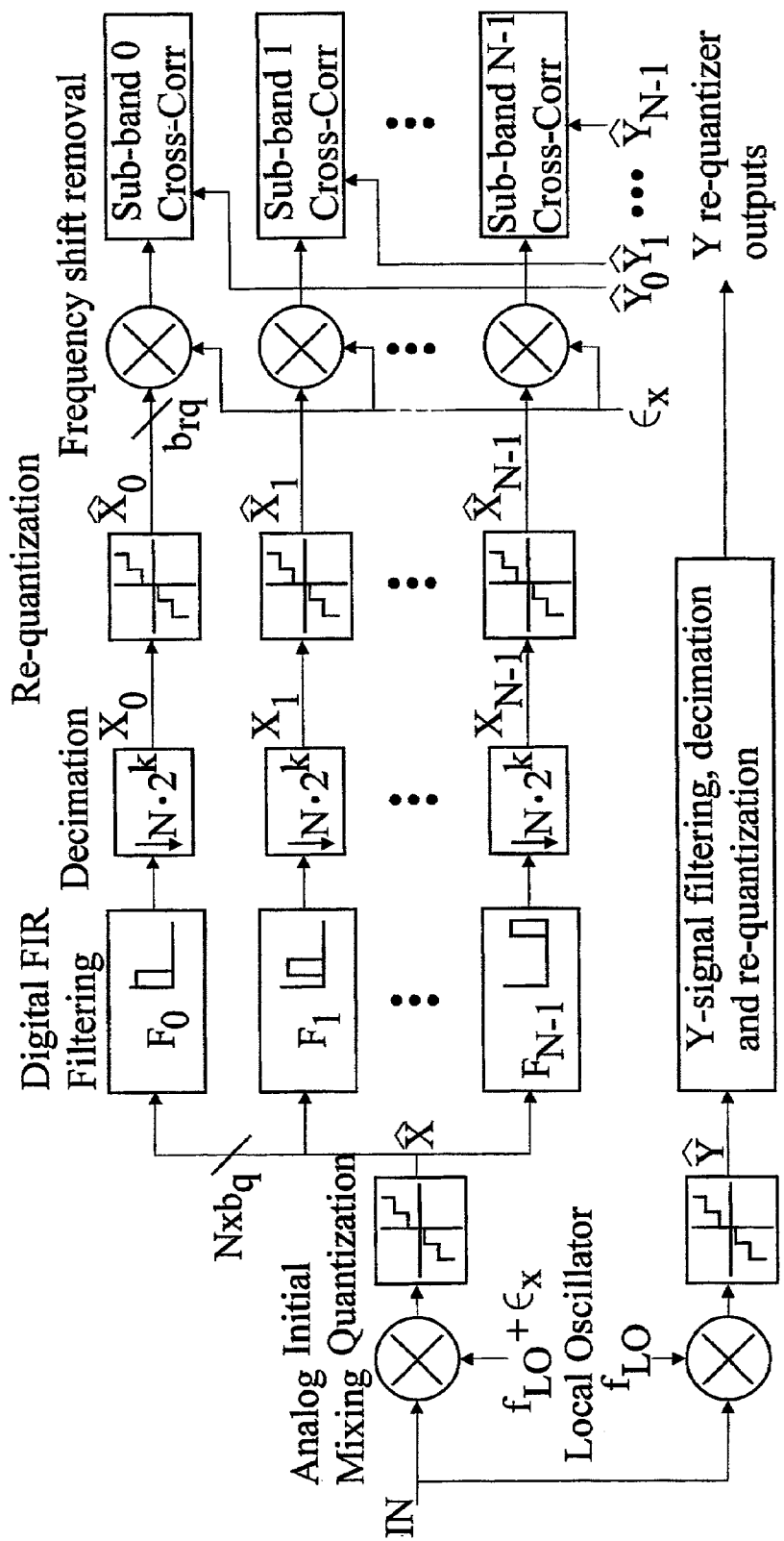
FIG. 5 is a is a simplified block diagram of a method according to the invention for spectral analysis of a wide-band signal.

Referring to FIG. 5 a simplified block diagram of a method for auto-power analyzing a signal according to the invention is shown. The method for auto-power analysis is a variation of the cross-power analysis method, shown in FIGS. 1a and 1b. Here, instead of two input signals X and Y one input signal is split into two. Each of the two split signals is then sampled independently and cross-correlated as disclosed above with respect to the cross-power analyzer.

Auto-power analyzers are used for spectrum analysis. Digital auto-correlation spectrometer allow rapid acquisition of all spectra in a band under consideration but suffer from limited dynamic range and absolute calibration uncertainty in the presence of high dynamic range, narrowband signals. The dynamic range is limited by quantization noise and calibration uncertainty arises since the amplitude of the output spectrum is always scaled to the power into the quantizer. Therefore, if input signals are changing in one part of the band, the entire spectrum amplitude will change. These problems can be overcome using the WIDAR technique according to the invention.

Figure 6A:
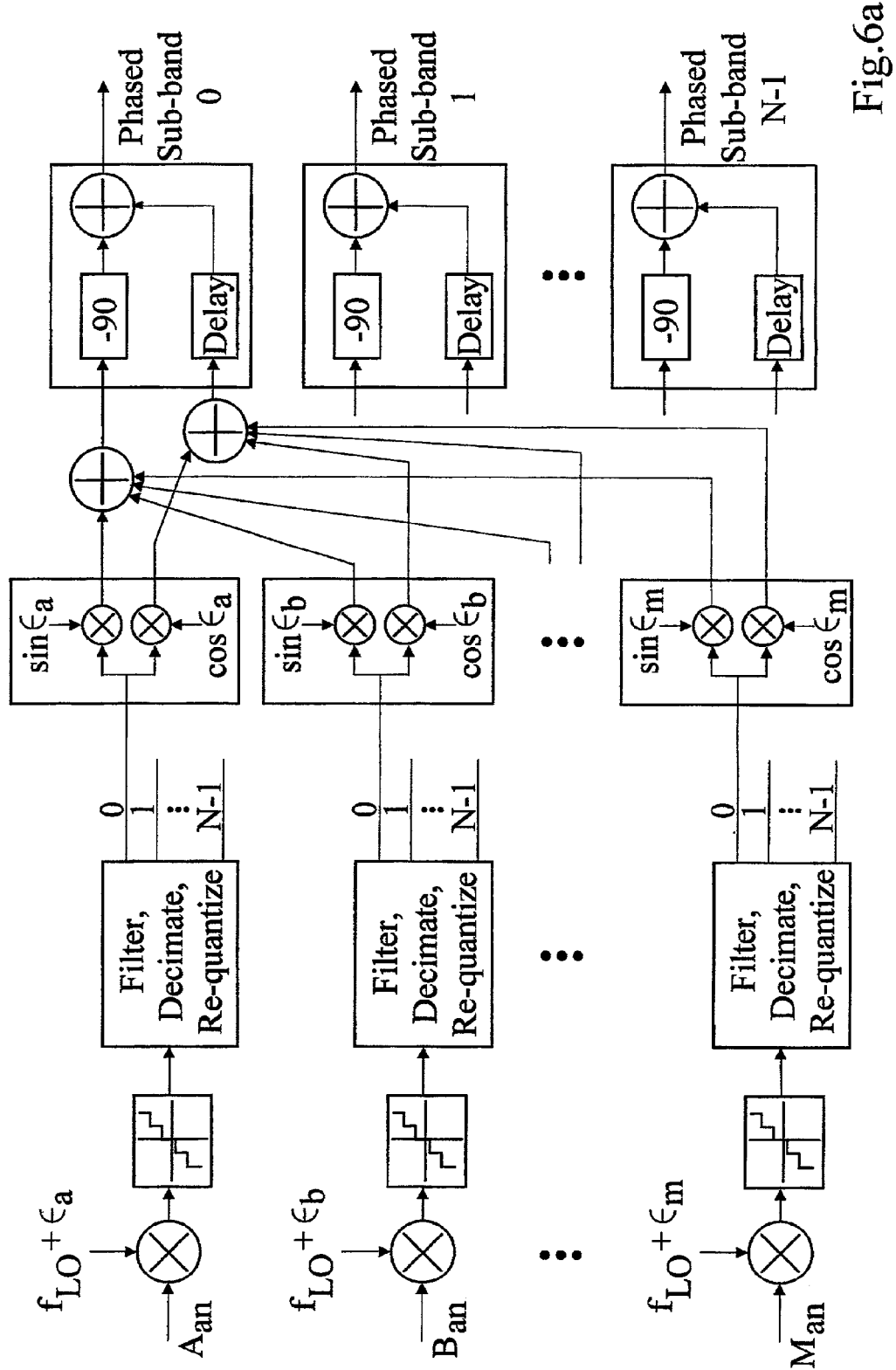
FIG. 6a is a simplified block diagram of a method according to the invention for spectral analysis of wide band signals from a phased array system; and, FIG. 6b is a simplified flow diagram of a method according to the invention for spectral analysis of wide band signals from a phased array system.
Figure 6B:
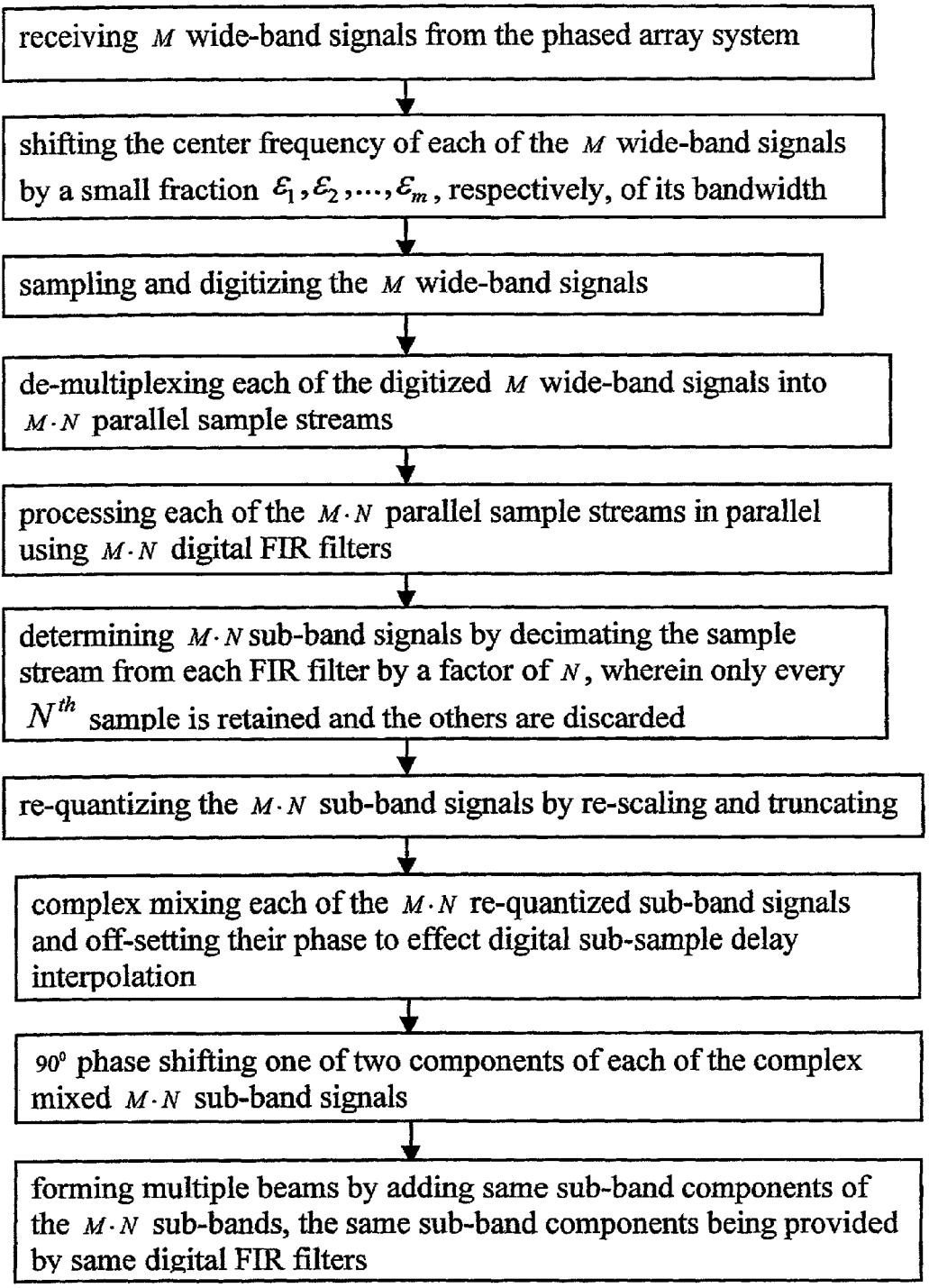

FIGS. 6a and 6b are diagrams illustrating a method for phased array signal analysis according to the invention using the WIDAR technique. A phased array system consists of a number of antennas, each with its own receiver. The combined beam of the phased array can be steered by electronically changing the delay in each receiver path before adding the signals. Steering range is determined by the beam of each antenna and steering precision is determined by the accuracy of the delay inserted into each receiver path. WIDAR allows phased array applications requiring wide bandwidths, high spectral resolution, high dynamic range, and high precision beam steering. Digital sub-sample delay interpolation allows insertion of precision delay in receiver paths. It provides fully digital $$\frac{1}{N}$$

sample delay interpolation for antenna delay compensation. After initial quantization, digital delay tracking to ±05 samples of delay is performed with simple integral delays.

The first processing steps of each of the antenna signals are similar to the cross-power analyzer shown in FIG. 1. After re-quantization the sub-band signals are fed to a complex mixer followed by 90° phase shift and addition fed with sub-bands provided by same digital filters for forming multiple beams. No correlator is shown in FIG. 6. If auto-correlation is required to allow sub-band spectra to be seamlessly stitched together, then a separate mixer, 90° phase shifter, and adder is required to produce the two outputs, which have to be provided to the WIDAR auto-correlator. If the phased sub-bands are to be cross-correlated with other antennae signals then the sub-band outputs would be provided to the cross-correlator resulting in cross power spectra with no aliased components. Some examples of phased array applications are phased array radar, remote sensing phased array receivers, and wideband phased antennae. In all these applications the WIDAR technique provides wide instantaneous bands and high spectral resolution as well as precision beam steering.

Numerous other embodiments of the invention will be apparent to persons skilled in the art without departing from the spirit and scope of the invention as defined in the appended claims.

The invention claimed is:

1. A method for real-time digital spectral analysis of wide-band signals comprising:
   receiving a wide-band signal;
   shifting the center frequency of the wide-band signal by a small fraction $\epsilon$ of its bandwidth;
   sampling and digitizing the shifting wide-band signal;
   processing the digitized shifting wide-band signal using a digital filter; and,
   decimating the digitally filtered shifting wide-band signal.

2. A method for real-time digital spectral analysis of wide-band signals comprising:
   receiving a wide-band signal;
   shifting the center frequency of the wide-band signal by a small fraction $\epsilon$ of its bandwidth;
   sampling and digitizing the shifting wide-band signal;
   de-multiplexing the digitized shifting wide-band signal into N parallel sample streams;
   processing the N parallel sample streams in parallel using N digital FIR filters; and,
   determining $2^k \cdot N; k=0,1, \ldots$ sub-band signals by decimating the sample stream from each digital FIR filter by a factor of $2^k \cdot N; k=0,1, \ldots$, wherein only every $2^k \cdot N^{th}; k=0,1, \ldots$ sample is retained and the others are discarded.

3. A method for real-time digital spectral analysis of wide-band signals as defined in claim 2, wherein the wide-band signal is sampled at a sample rate of at least twice the bandwidth of the wide-band signal.

4. A method for real-time digital spectral analysis of wide-band signals as defined in claim 2, wherein each of the N digital FIR filters has a different tap-weight.

5. A method for real-time digital spectral analysis of wide-band signals as defined in claim 4, wherein each digital FIR filter is a cosine symmetric digital FIR filter having a linear phase.

6. A method for real-time digital spectral analysis of wide-band signals as defined in claim 5, wherein the bandwidth of each digital FIR filter is approximately 1/N of the bandwidth of the wide-band signal.

7. A method for real-time digital spectral analysis of wide-band signals as defined in claim 2, comprising re-quantization by re-scaling and truncating the $2^k \cdot N; k=0,1, \ldots$ sub-band signals in order to reduce downstream processing load.

8. A method for real-time digital spectral analysis of wide-band signals as defined in claim 2, comprising phase rotating the $2^k \cdot N; k=0,1, \ldots$ sub-band signals by phase $\epsilon$ using a digital phase rotator producing a de-rotated sub-band signal.

9. A method for cross-correlating de-rotated sub-band signals sub-band by sub-band, the method comprising:
   receiving $2^k \cdot N; k=0,1, \ldots$ pairs of first and second de-rotated sub-band signals at $2^k \cdot N; k=0,1, \ldots$ cross-correlators, wherein each pair is received at a different cross-correlator of the $2^k \cdot N; k=0,1, \ldots$ cross-correlators;
   delaying one of the first and second de-rotated sub-band signals with respect to the other in a series of delay intervals at each of the $2^k \cdot N; k=0,1, \ldots$ cross-correlators;
   forming the product of the first and the second de-rotated sub-band signals at each of the delay intervals at each of the $2^k \cdot N; k=0,1, \ldots$ cross-correlators;
   producing a sub-band cross-correlation result at each of the $2^k \cdot N; k=0,1, \ldots$ cross-correlators by summing the products over a period of time;
   transforming each sub-band cross-correlation result at each of the $2^k \cdot N; k=0,1, \ldots$ cross-correlators by means of a Fourier Transform into a cross-spectrum result; and,
   correcting each cross-power spectral point of each sub-band cross-spectrum result with a sub-band scaling term, a gain differential compensation term, a band-shape correction term and a wide-band power gain term.

10. A method for cross-correlation de-rotated sub-band signals sub-band by sub-band as defined in claim 9, comprising digital sub-sample delay interpolation of the de-rotated sub-band signals.

11. A method for cross-correlating de-rotated sub-band signals sub-band by sub-band as defined in claim 9, wherein the delay intervals are equivalent to one sample-interval of a sub-band signal.

12. A method for cross-correlating de-rotated sub-band signals sub-band by sub-band as defined in claim 9, wherein the Fourier Transform is performed after each period of time of summing the products.

13. A method for cross-correlating de-rotated sub-band signals sub-band by sub-band as defined in claim 9, comprising band flattening each of the $2^k \cdot N; k=0,1, \ldots$ sub-band cross-spectra.

14. A method for cross-correlating de-rotated sub-band signals sub-band by sub-band as defined in claim 9, comprising scaling each of the $2^k \cdot N; k=0,1, \ldots$ sub-band cross-spectra by a cross spectrum weighting function.

15. A method for cross-correlating de-rotated sub-band signals sub-band by sub-band as defined in claim 9, comprising concatenating the $2^k \cdot N; k=0,1, \ldots$ sub-band cross-spectra to obtain a wide-band spectrum.

16. A method for cross-correlating de-rotated sub-band signals sub-band by sub-band, the method comprising:
   receiving $2^k \cdot N; k=0,1, \ldots$ pairs of first and second de-rotated sub-band signals at $2^k \cdot N; k=0,1, \ldots$ cross-correlators, wherein each pair is received at a different cross-correlator of the $2^k \cdot N; k=0,1, \ldots$ cross-correlators;
   transforming each pair of first and second de-rotated sub-band signals at each of the $2^k \cdot N; k=0,1, \ldots$ cross-correlators by means of a Fourier Transform into frequency domain;
   complex cross-multiplying the Fourier transformed first and second de-rotated sub-band signals at each of the $2^k \cdot N; k=0,1, \ldots$ cross-correlators; and,
   time-averaging the cross-multiplied first and second de-rotated sub-band signals.

17. A method for real-time digital spectral analysis of wide-band signals comprising the steps of:
receiving a first and a second wide-band signal;
shifting the center frequency of each of the first and the second wide-band signal by a small fraction $\epsilon_1$ and $\epsilon_2$, respectively, of its bandwidth;
sampling and digitizing the first and the second wide-band signal;
de-multiplexing each of the digitized first and second wide-band signals into first N parallel sample streams and second N parallel sample streams;
processing each of the first and the second N parallel sample streams in parallel using 2·N digital FIR filters;
determining first and second N sub-band signals by decimating the sample stream from each digital FIR filter by a factor of N, wherein only every $N^{th}$ sample is retained and the others are discarded;
re-quantizating the N sub-band signals by re-scaling and truncating in order to reduce downstream processing load;
phase rotating each of the first and second N sub-band signals by phase $\epsilon_1$ and $\epsilon_2$, respectively, using a digital phase rotator producing first and second N de-rotated sub-band signals;
receiving pairs of the first and second N de-rotated sub-band signals at N cross-correlators, wherein each pair is received at a different cross-correlator of the N cross-correlators;
delaying one of the first and second de-rotated sub-band signals with respect to the other in a series of delay intervals at each of the N cross-correlators;
forming the product of the first and the second de-rotated sub-band signals at each of the delay intervals at each of the N cross-correlators;
producing a sub-band cross-correlation result at each of the N cross-correlators by summing the products over a period of time;
transforming each sub-band cross-correlation result at each of the N cross-correlators by means of a Fourier Transform into a cross-spectrum result;
correcting each cross-power spectral point of each sub-band cross-spectrum result with a sub-band scaling term, a gain differential compensation term, a band-shape correction term and a wide-band power gain term; and,
concatenating the N sub-band cross-spectra to obtain a wide-band spectrum.

18. A method for real-time digital spectral analysis of wide-band signals as defined in claim 17, wherein the frequency shifts $\epsilon_1$ and $\epsilon_2$ are arbitrary.

19. A method for real-time digital spectral analysis of wide-band signals as defined in claim 18, wherein the frequency shifts $\epsilon_1$ and $\epsilon_2$ are varied in a quasi-random way during a period of time of summing the products.

20. A method for real-time digital spectral analysis of wide-band signals as defined in claim 17, wherein the first and the second wide-band signal are a same wide-band signal.

21. A method for real-time digital spectral analysis of wide-band signals of a phased array system comprising:
receiving M wide-band signals from the phased array system;
shifting the center frequency of each of the M wide-band signals by a small fraction $\epsilon_1, \epsilon_2, \ldots, \epsilon_m$, respectively, of its bandwidth;
sampling and digitizing the M shifting wide-band signals;
de-multiplexing each of the digitized M shifting wide-band signals into M·N parallel sample streams;
processing each of the M·N parallel sample streams in parallel using M·N digital FIR filters;
determining M·N sub-band signals by decimating the sample stream from each digital FIR filter by a factor of N, wherein only every $N^{th}$ sample is retained and the others are discarded;
re-quantizing the M·N sub-band signals by re-scaling and truncating;
complex mixing each of the M·N re-quantized sub-band signals;
90° phase shifting one of two components of each of the complex mixed M·N sub-band signals; and,
forming multiple beams by adding same sub-band components of the M·N sub-bands, the same sub-band components being provided by same digital FIR filters.

22. A method for real-time digital spectral analysis of wide-band signals as defined in claim 21, comprising digital sub-sample delay interpolation of the digitized M wide-band signals.

23. A system for real-time digital spectral analysis of wide-band signals comprising:
a port for receiving a wide-band signal;
a frequency shifter for shifting the center frequency of the wide-band signal by a small fraction $\epsilon$ of its bandwidth;
an A/D converter for sampling and digitizing the shifting wide-band signal;
a de-multiplexer for de-multiplexing the digitized shifting wide-band signal into N parallel sample streams; and,
N processors, each processor for processing one of the N parallel sample streams by digitally FIR filtering and decimating the sample stream in order to determine a sub-band signal.

24. A system for real-time digital spectral analysis of wide-band signals as defined in claim 23, wherein the frequency shifter the center frequency comprise an analog mixer and a local oscillator.

25. A system for real-time digital spectral analysis of wide-band signals as defined in claim 23, wherein the frequency shifter the center frequency comprise a digital single-sideband mixer.

26. A system for real-time digital spectral analysis of wide-band signals as defined in claim 23, wherein each of the N processors re-quantizes the sub-band signal.

27. A system for real-time digital spectral analysis of wide-band signals as defined in claim 23, wherein each of the N processors digitally phase rotates the sub-band signal by phase-rate $\epsilon$.

28. A system for real-time digital spectral analysis of wide-band signals as defined in claim 27, wherein each of the N processors digitally cross-correlates the sub-band signal with a respective second sub-band signal.

* * * * *